Sept. 1, 1953 G. M. MacGINNIS 2,650,763
TAX CALCULATOR
Filed Dec. 11, 1950
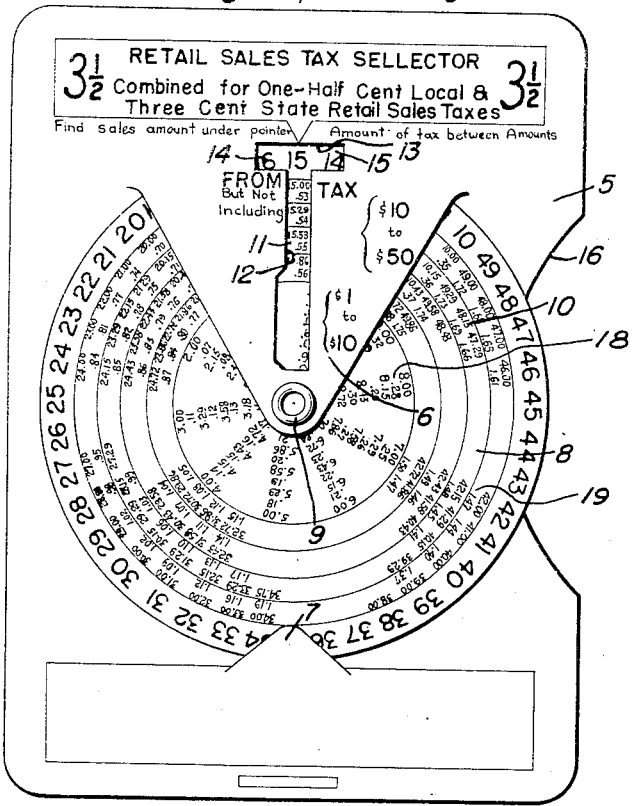
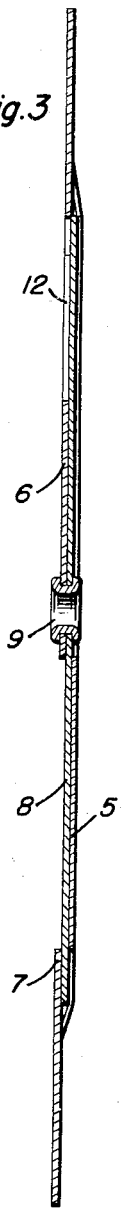
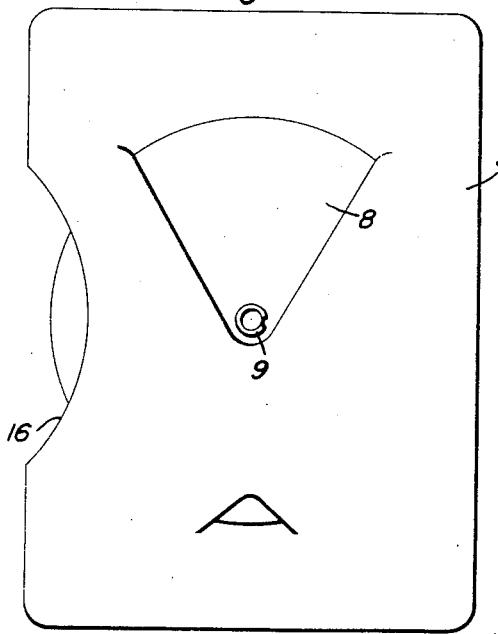
Gerald M. MacGinnis
INVENTOR.

Patented Sept. 1, 1953

2,650,763

UNITED STATES PATENT OFFICE 2,650,763

TAX CALCULATOR

Gerald M. MacGinnis, San Francisco, Calif.

Application December 11, 1950, Serial No. 200,237

2 Claims. (Cl. 235—88)

The present invention relates to new and useful improvements in calculators and more particularly to a pocket size calculator for computing a sales tax on merchandise within a predetermined cost range.

An important object of the invention is to provide a novel mounting or back plate for a rotatable chart for conveniently holding the chart while it is moved into its various computing positions.

Another object is to provide an inexpensive sales tax calculator of simple and practical construction which is efficient and reliable in operation and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a front elevational view;

Figure 2 is a rear elevational view; and

Figure 3 is an enlarged vertical sectional view taken on a line 3—3 of Figure 1.

Referring now to the drawing in detail, wherein for the purpose of illustration I have disclosed a preferred embodiment of my invention, the numeral 5 designates a backing plate which may be constructed of cardboard, plastic, lightweight metal, or other suitable material, and stamped to form an upper V-shaped tongue 6 and a lower V-shaped tongue 7 having spaced apart opposed free ends and united at one edge to the backing plate.

A disc 8 is placed behind tongues 6 and 7 and in front of backing plate 5 and is connected to the free end of upper tongue 6 by a rivet 9 to rotatably mount the disc in front of the backing plate. The material of the backing plate 5 and tongues 6 and 7 is sufficiently stiff to frictionally hold the disc in a rotatably adjusted position therebetween.

Disc 8 carries indicia 10 representing sales tax computations for the cost of merchandise indicated at 11, and with the related computations arranged radially on the face of the disc to register in a T-shaped window opening 12 in upper tongue 6. The transverse opening 13 at the top of the window brings the next higher and lower cost figures designated at 14 and 15 at the margin of the disc into view. The indicia displayed on disk 8 includes a central group of radial rows of sales tax computations 18 representing sales below the amount of $10.00 and an outer group of radial rows of sales tax computations 19 representing sales amounting from $10.00 to $50.00. The radial rows of computations 18 are aligned with the radial rows of computations 19 and the row of highest computations of the central group 18, representing sales amounting to $9.00 and fractions thereof are radially aligned with the row of lowest computations of group 19 representing sales amounting to $10.00 and fractions thereof, whereby both the highest and lowest rows of computations of the two groups will simultaneously register in the window opening 12 to facilitate progressing from the lower group of computations to the higher at their point of change-over.

The side edge of the backing plate 5 is formed with a relief or recess 16 in which the edge of the disc projects to enable gripping by the fingers of a person to turn the disc whereby a desired sales amount may be brought into register with the window opening 12 to prominently display its previously computed tax.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. In a calculator of the class described, a backing plate, a tongue partially cut from the backing plate, having a T-shaped window opening, and a disc rotatably carried by the tongue and frictionally held between the backing plate and the tongue, said disk having indicia thereon arranged in radial rows adapted for registering an entire row of indicia in the window opening and with the radially outermost indicia of at least two of the adjacent rows registering in the top of the window opening.

2. In a calculator of the class described, a backing plate, a tongue partially cut from the backing plate and having a T-shaped window opening, an a disc rotatably carried by the tongue and frictionally held between the backing plate and the tongue, said disc having indicia thereon and including a central group of sales tax computations and an outer group of sales tax computations arranged in radial rows aligned with each other, each row representing amounts in dollars and fractions thereof and with a computed sales tax adjacent thereto, and the central rows representing amounts of less value than the outer rows and all of the rows being selectively registrable with the window opening and said radial row of the central group of highest value and said radial row of the outer group of lowest value being radially aligned with each other for simultaneous registry with the window opening to facilitate progressively reading the computations of said highest and lowest rows at the point of change-over from one row to the other, and the radially outermost indicia of at least two of the adjacent radial rows of the computations being adapted to simultaneously register in the top of the T-shaped opening to determine the direction in which the disc should be turned to register higher or lower amounts with the opening.

GERALD M. MacGINNIS.

References Cited in the file of this patent

UNITED STATES PATENTS

| Number | Name | Date |
|---|---|---|
| 351,131 | Snider | Oct. 19, 1886 |
| 855,827 | Willson | June 4, 1907 |
| 903,192 | Hunt | Nov. 10, 1908 |